(No Model.)
A. DE DION & G. T. BOUTON.
DRIVING MECHANISM FOR SELF MOVING VEHICLES.
No. 562,289. Patented June 16, 1896.
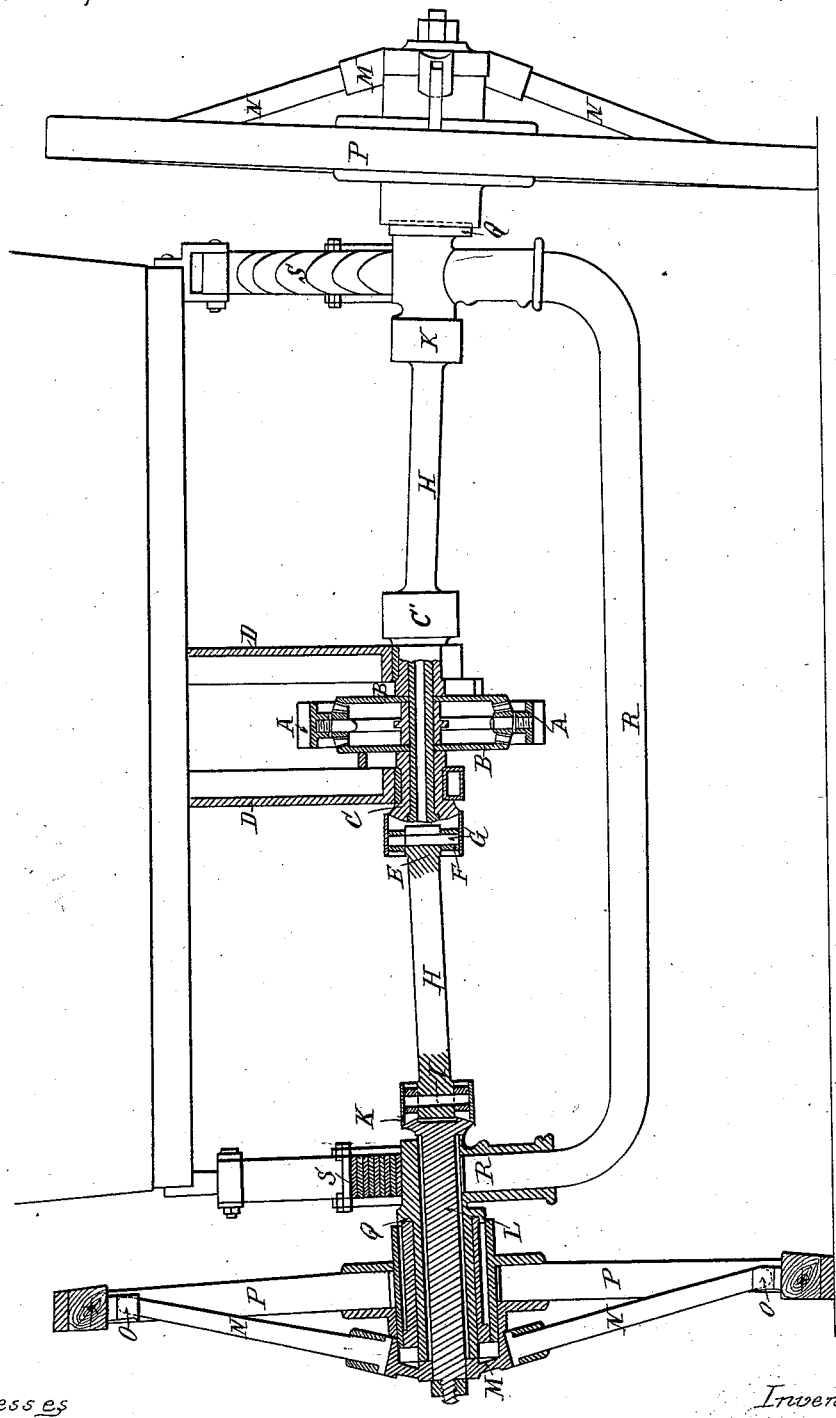
Witnesses
Frank N. Hume
Robert Everett
Inventors,
Albert de Dion
George T. Bouton,
By James L. Norris
Atty.

United States Patent Office.

ALBERT DE DION AND GEORGES THADÉE BOUTON, OF PARIS, FRANCE.

DRIVING MECHANISM FOR SELF-MOVING VEHICLES.

SPECIFICATION forming part of Letters Patent No. 562,289, dated June 16, 1896.

Application filed December 30, 1895. Serial No. 573,749. (No model.) Patented in France March 20, 1893, No. 228,743; in England July 31, 1894, No. 14,698, and in Germany August 4, 1894, No. 82,789.

*To all whom it may concern:*

Be it known that we, ALBERT DE DION and GEORGES THADÉE BOUTON, citizens of France, and residents of Paris, in the Department of the Seine, France, have invented a new and useful Improvement in Driving Mechanism for Self-Moving Vehicles, (which has been patented in France March 20, 1893, No. 228,743; in Great Britain July 31, 1894, No. 14,698, and in Germany August 4, 1894, No. 82,789,) of which the following is a specification.

This invention relates to improvements in apparatus for operating driving-wheels of self-moving vehicles for use on ordinary roads.

The object of this invention is to enable the motor mechanism to drive the wheels of a vehicle or carriage without being subjected to any shaking or jolting which the wheels are liable to sustain owing to the unevenness of the road and to bring into practical use, for self-driven motors, wooden wheels, which experience has shown to be more elastic and better fitted for this sort of work than wheels of metal.

The driving-wheels of a carriage on springs can only be driven by motor fixed to the frame by means of certain mechanical devices differing from those employed for driving stationary engines. The connection in fact must be rigid for transmitting the impulse received and yet the axle which passes through the center of the two wheels must be capable of being inclined in any direction to a considerable extent in relation to the frame of the carriage according to the greater or less resiliency of the springs. For describing curves or turning round it is also necessary that the speed of rotation of each of the wheels be proportional to the development of the curve to be described. This is obtained by various means, notably by mounting each of the wheels on a separate shaft and by connecting the two shafts by means of differential gearing. One of the objects of this invention is to enable this differential gearing to be fixed to the frame of the carriage or the like in such a manner that it is driven from the motor by mechanical means similar to those used for a fixed machine and to communicate the movement of rotation of the shafts of differential gearing to the driving-wheels. According to this invention this connection between the shafts of the differential gearing and the axle of the driving-wheels, which need not be parallel to the former and may deviate therefrom in all directions within the limits of the variable flexibility of the suspension-springs, is obtained by interposing between the shafts which it is required to operate a link device with two jointed heads or by one of Cardan's arrangements doing duty for joints. As it is necessary to mount the driving-wheels in the journals of a rigid axle, the said axle is formed in such a manner in its part between the two journals as to leave a free space for the differential movement. Then by hollowing out or perforating the heads or journals and passing through them shafts connected to the jointed links the movement of rotation is transferred to the outside of the said heads or journals of the axle or shaft. An engaging or connecting part is then arranged on the outside extremity of each of these shafts causing the motor-wheels to turn; but it should be noticed that this connection between each of the wheels and the motor-shaft demands a connection between the shaft and the felly of the wheel—that is to say, the conversion of the rotary strain which the said shaft receives into a force applied to the felly.

When, as often happens, the resistance of the felly to the tangential force which is imparted to it is subject to but slight variations, a rigid connection is obtained by fixing the nave of the wheel to the motor-axle and using a wheel with a solid core-piece or with sufficiently-strong spokes; but in the latter case if the felly of the wheel does not experience the same resistance throughout the spokes have a tendency to work loose and vibrate. The result is that the wheels with wooden spokes work loose, the wear is rapid and breakage follows; and further the fact of having to transmit driving power by the spokes necessitates imparting to the latter a sectional area calculated on the bending strain and not merely on the weight supported by the wheels. These observations refer particularly to the case of wooden wheels employed as driving-wheels in self-driven vehicles. In fact, in spite of suspension-springs the uneven surface of roads varies the adherence of the wheels to the ground, and although wooden wheels may render excellent service when they are employed merely for porterage they soon deteriorate when used as driving-wheels, as the various twisting strains to which they are subjected rapidly wear them out or even break them altogether.

The second object of this invention is to enable wooden wheels to be used, so as to profit by the supple and elastic nature they possess over rigid metal wheels. For this purpose the strains to which the wooden parts are subjected are reduced to simply that of carrying the vehicle, and this result is obtained by means of metallic pieces by which the rotating shaft is connected to the felly of the wheel, and these metallic parts are so arranged as to offer no resistance to the elastic or spring-like movements of all parts of the wheel which then acts solely for the purpose of porterage, as in the case of a vehicle that is being towed or dragged. The metallic connection is placed on the interior or exterior of the couple of motor-wheels. This connection consists of a crank part rigidly connected to the turning axle and simply bearing on a gudgeon which projects from the felly of the driving-wheel. To fix the head of this crank on the turning axle, means are employed varying according to the arrangement of the said axle, and two examples will now be described which can be used in the case of the rotating shaft passing through the axle-journal.

In the first example the crank or connection is exterior to the wheel keyed on an extension of the motor-shaft and its free end bears laterally against the stud or boss projecting from the felly of the wheel.

In the second example the crank or connection also operates a stud projecting from the felly, but this stud is on the internal face. The crank is then connected to a socket or sleeve which caps or surrounds the journal and extending beyond the end thereof is fixed on the extension of the motor-shaft. The wheel then turns with the crank, but since its nave is not connected to this crank there cannot be any torsion of the spokes.

The accompanying drawing shows in half-elevation and half-section a motor-axle and driving-wheel and part connected therewith constructed according to this invention, illustrating more particularly the aforesaid first example.

A is the toothed wheel operated by the motor engaging with differential gearing B, mounted on a shaft C. The said shaft C is connected at each end to the shafts L, carrying the driving-wheels by means of universal joints C' and K and intermediate links H. These joints are formed by hollow parts provided on both ends of the shaft C and the inner ends of the shafts L, into which take the heads E of the links H, provided with engaging pieces F, turning on axes G. By this arrangement the links H are capable of assuming any desired angle or inclination according to the bending of the springs of the vehicle. The connecting parts N of the said wheel are shown formed by flat springs, four, for example, for each wheel. They are attached at their inner ends to the center piece M, passed on the axle L, and engage at their outer ends between the two cheeks or branches of double tappets O or the like fixed on the felly P of the driving-wheel. The main axle R, on which the wheels turn, is cranked so as to make room for the differential gearing already described. Sleeves Q, fixed to the said main axle R, constitute bearings for the shafts L of the wheels. Suspension-springs S form the connection between the driving-wheels and the frame T of the carriage. All the central mechanism as well as the spindles are by preference inclosed in a metal or other suitable casing to protect them from dust.

This invention is not limited to the precise form, dimensions, proportions and materials herein referred to nor to the minor details of construction. For instance, the double tappets may be fixed either on the inner side of the felly, as shown in the drawing, or on one or the other of its plane faces or on one or several of the spokes of the wheel, so as to cause the flat springs to act directly on the said spoke in the same way as on the felly, although this last means gives less favorable results.

Having described our invention, what we claim is—

1. In self-driven vehicles, the combination with a rigid axle provided at its opposite ends with hollow journals supported by springs connected to the vehicle-body, of drive-wheels journaled on said hollow journals, wheel-axles journaled in said hollow journals and connected to the wheels, a motor-operated shaft, and links connected to the motor-operated shaft and the wheel-axles by universal joints, substantially as described.

2. In self-driven vehicles, the combination with the motor-operated shaft, of wheel-axles connected to said shaft, a driven wheel upon each axle, a center piece as M, passed upon the end of each axle, and connections between said center pieces and the fellies of the wheels, substantially as described.

3. In a self-driven vehicle, the combination with the motor-operated shaft, of wheel-axles connected to said shaft, a driven wheel upon each axle, a center piece passed upon the end of each axle, and flexible connections between the said center pieces and fellies of the wheels, substantially as described.

4. In a self-driven vehicle, the combination with the motor-operated shaft, of wheel-axles linked to said shaft, a driven wheel upon each axle, a center piece passed upon the outer end of each axle, and flat springs connecting the said center pieces with the fellies of the wheels, substantially as described.

5. In a self-driven vehicle, the combination with the motor-operated shaft, of wheel-axles linked to and having universal connections with said motor-shaft, a driven wheel upon each axle, a center piece passed upon the outer end of each axle, and flexible connections between the said center pieces and the fellies of the wheels, substantially as described.

In testimony whereof we have signed this specification in the presence of two subscribing witnesses.

ALBERT DE DION.
GEORGES THADÉE BOUTON.

Witnesses:
GEORGES DELOM,
CLYDE SHROPSHIRE.